United States Patent
Srinivasan et al.

(10) Patent No.: US 10,713,217 B2
(45) Date of Patent: Jul. 14, 2020

(54) METHOD AND SYSTEM TO MANAGING PERSISTENT STORAGE USING PERFECT HASHING

(71) Applicant: EMC IP Holding Company LLC, Hopkinton, MA (US)

(72) Inventors: Srikanth Srinivasan, Bengaluru (IN); Ramprasad Chinthekindi, San Jose, CA (US); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 16/174,474

(22) Filed: Oct. 30, 2018

(65) Prior Publication Data

US 2020/0134042 A1  Apr. 30, 2020

(51) Int. Cl.
*G06F 16/11* (2019.01)
*G06F 16/13* (2019.01)
*G06F 16/17* (2019.01)
*G06F 21/62* (2013.01)

(52) U.S. Cl.
CPC .......... *G06F 16/137* (2019.01); *G06F 16/128* (2019.01); *G06F 16/1727* (2019.01); *G06F 21/6218* (2013.01)

(58) Field of Classification Search
CPC .. G06F 16/128; G06F 16/137; G06F 16/1727; G06F 21/6218
See application file for complete search history.

(56) References Cited

U.S. PATENT DOCUMENTS

| 6,058,392 | A  | 5/2000  | Sampson     |
| 7,792,877 | B2 | 9/2010  | Chellapilla |
| 7,965,297 | B2 | 6/2011  | Hoppe       |
| 8,190,835 | B1 | 5/2012  | Yueh        |
| 8,316,064 | B2 | 11/2012 | Hsu         |
| 8,387,003 | B2 | 2/2013  | Darcy       |

(Continued)

FOREIGN PATENT DOCUMENTS

| EP | 2738665 A1    | 6/2014  |
| WO | 2013115822 A1 | 8/2013  |
| WO | 2014185918 A1 | 11/2014 |

OTHER PUBLICATIONS

Douglis, Fred, et al., "The Logic of Physical Garbage Collection in Deduplicating Storage", Proceedings of the 15th USENIX Conference on File and Storage Technologies, Feb. 27, 2017-Mar. 2, 2017, ISBN 978-1-931971-36-2. (Year: 2017).*

(Continued)

*Primary Examiner* — Scott A. Waldron
(74) *Attorney, Agent, or Firm* — Chamberlain, Hrdlicka, White, Williams & Aughtry

(57) ABSTRACT

In general, embodiments of the invention relate to a method and system for managing persistent storage in a local computing device. More specifically, embodiments of the invention relate to determining the amount of space that will be freed up (or become available) in the persistent storage during a data transfer using a perfect hash function. Once the amount of data to be transferred is determined, embodiments of the invention initiate the allocation of an appropriate amount of space in the remote storage device and, subsequently, initiate the transfer of the data to the remote storage device.

20 Claims, 7 Drawing Sheets

(56) References Cited

U.S. PATENT DOCUMENTS

| | | |
|---|---|---|
| 8,396,841 B1 | 3/2013 | Janakiraman |
| 8,825,667 B2 | 9/2014 | Hsu |
| 8,898,114 B1 | 11/2014 | Feathergill et al. |
| 8,898,120 B1 | 11/2014 | Efstathopoulos |
| 8,918,390 B1 | 12/2014 | Shilane et al. |
| 8,943,032 B1 | 1/2015 | Xu |
| 8,949,208 B1 | 2/2015 | Xu et al. |
| 9,317,218 B1 | 4/2016 | Botelho |
| 9,367,448 B1 | 6/2016 | Botelho |
| 9,405,761 B1 | 8/2016 | Botelho |
| 9,424,185 B1 | 8/2016 | Botelho |
| 9,430,164 B1 | 8/2016 | Botelho |
| 9,455,996 B2 | 9/2016 | Chao |
| 9,594,674 B1 | 3/2017 | Mondal |
| 9,715,505 B1 | 7/2017 | Mondal |
| 9,830,111 B1 | 11/2017 | Patiejunas et al. |
| 10,002,048 B2 | 6/2018 | Chennamsetty et al. |
| 10,031,672 B2 | 7/2018 | Wang et al. |
| 10,108,543 B1 | 10/2018 | Duggal |
| 10,108,544 B1 | 10/2018 | Duggal |
| 10,146,697 B1 | 12/2018 | Duggal |
| 10,417,190 B1 * | 9/2019 | Donlan ............ G06F 3/0608 |
| 2007/0245119 A1 | 10/2007 | Hoppe |
| 2008/0275847 A1 | 11/2008 | Chellapilla |
| 2009/0235115 A1 | 9/2009 | Butlin et al. |
| 2010/0049735 A1 | 2/2010 | Hsu |
| 2010/0094817 A1 | 4/2010 | Ben-Shaul et al. |
| 2011/0099175 A1 | 4/2011 | Darcy |
| 2011/0099351 A1 | 4/2011 | Condict |
| 2011/0196869 A1 | 8/2011 | Patterson et al. |
| 2013/0036104 A1 | 2/2013 | Hsu |
| 2013/0086017 A1 | 4/2013 | Chao |
| 2013/0138620 A1 | 5/2013 | Yakushev et al. |
| 2014/0258248 A1 | 9/2014 | Lambright et al. |
| 2014/0258824 A1 | 9/2014 | Khosla et al. |
| 2014/0310476 A1 | 10/2014 | Kruus et al. |
| 2015/0106345 A1 | 4/2015 | Trimble et al. |

OTHER PUBLICATIONS

Deepavali Bhagwat et al.; "Extreme Binning: Scalable, Parallel Deduplication for Chunk-based File Backup"; IEEE MASCOTS; Sep. 2009 (10 pages).

International Search Report and Written Opinion issued in corresponding PCT Application PCT/US2018/027646, dated Jul. 27, 2018. (30 pages).

International Search Report and Written Opinion issued in corresponding WO Application No. PCT/US2018/027642, dated Jun. 7, 2018 (15 pages).

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

Avrim, Lecture 10—Universal and Perfect Hashing, Lecture 10, (Year: 2017), archived from Jun. 1, 2017, cmu.edu, US (9 pages).

Botelho et al., Simple and Space-Efficient Minimal Perfect Hash Functions, WADS'07 Proceedings of the 10th International Conference on Algorithms and Data Structures, Aug. 15-17, 2007, Halifax, Canada, US (13 pages).

Damian Gryski, Minimal Perfect Hash Functions, Gopher Academy Blog, Dec. 3, 2017, Gopher Academy, US (12 pages).

Robert M. Kline, Hash Sets, Jul. 25, 2017, archived from Jul. 25, 2017, 12 pgs., wcupa.edu, US (12 pages).

Tarkoma et al, Theory and Practice of Bloom Filters for Distributed Systems, IEEE Communications Surveys & Tutorials, (Year 2012), vol. 14, No. 1 First Quarter 2012, US (25 pages).

* cited by examiner

METHOD AND SYSTEM TO MANAGING PERSISTENT STORAGE USING PERFECT HASHING

BACKGROUND

Computing device generate and storage large amounts of data. Over time, the data that is stored may be transferred to a remote storage system. Depending on how the data is initially stored by the computing device, it may be difficult to efficiently manage the stored data and to transfer the stored data to the remote storage system.

SUMMARY

In one aspect, a method for managing persistent storage in accordance with one or more embodiments of the invention includes generating a perfect hash function (PHF) using a snapshot for a plurality of files stored in the persistent storage, populating a bit vector using the PHF and a plurality of segment references to obtain a populated bit vector, wherein each of the plurality of segment references is associated with at least one candidate file of a plurality of candidate files and wherein the plurality of candidate files is a subset of the plurality of files. The method further comprises updating the bit vector using the PHF and a second plurality of segment references to obtain an updated bit vector, wherein each of the second plurality of segment references is associated with at least one non-candidate file of a plurality of non-candidate files and wherein the plurality of non-candidate files is a second subset of the plurality of files, making a determination that a projected freed amount of space in the persistent storage is below a threshold amount, wherein the projected freed amount of space is determined using the updated bit vector, and performing an action based on the determination.

In one aspect, a system in accordance with one or more embodiments of the invention includes persistent storage comprising a plurality of files, a processor, and a local computing device manager that, when executed by the processor, performs a method. The method includes generating a perfect hash function (PHF) using a snapshot for the plurality of files, populating a bit vector using the PHF and a plurality of segment references to obtain a populated bit vector, wherein each of the plurality of segment references is associated with at least one candidate file of a plurality of candidate files and wherein the plurality of candidate files is a subset of the plurality of files, updating the bit vector using the PHF and a second plurality of segment references to obtained an updated bit vector, wherein each of the second plurality of segment references is associated with at least one non-candidate file of a plurality of non-candidate files and wherein the plurality of non-candidate files is a second subset of the plurality of files, making a determining that a projected freed amount of space in the persistent storage below a threshold amount, wherein the projected freed amount of space is determined using the updated bit vector, and performing an action based on the determination.

In one aspect, a non-transitory computer readable medium in accordance with one or more embodiments of the invention includes computer readable program code, which when executed by a computer processor enables the computer processor to perform a method for processing input/output (I/O) requests. The method includes generating a perfect hash function (PHF) using a snapshot for a plurality of files stored in the persistent storage, populating a bit vector using the PHF and a plurality of segment references to obtain a populated bit vector, wherein each of the plurality of segment references is associated with at least one candidate file of a plurality of candidate files and wherein the plurality of candidate files is a subset of the plurality of files. The method further comprises updating the bit vector using the PHF and a second plurality of segment references to obtain an updated bit vector, wherein each of the second plurality of segment references is associated with at least one non-candidate file of a plurality of non-candidate files and wherein the plurality of non-candidate files is a second subset of the plurality of files, making a determination that a projected freed amount of space in the persistent storage is below a threshold amount, wherein the projected freed amount of space is determined using the updated bit vector, and performing an action based on the determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
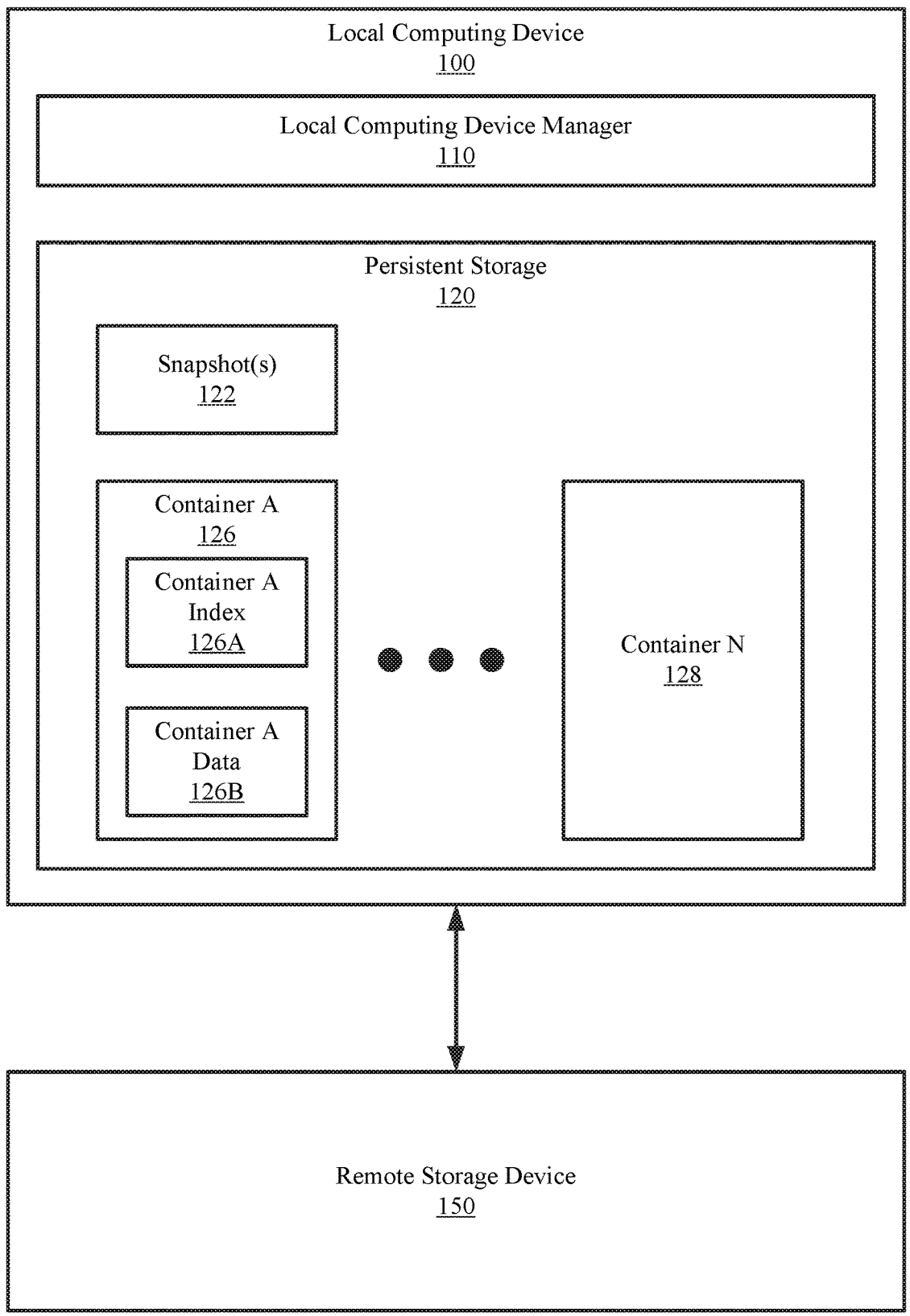
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for managing persistent storage in a local computing device. More specifically, embodiments of the invention relate to determining the amount of space that will be freed up (or become available) in the persistent storage during a data transfer using a perfect hash function. Once the amount of data to be transferred is determined, embodiments of the invention initiate the allocation of an appropriate amount of space in the remote storage device and, subsequently, initiate the transfer of the data to the remote storage device. By generating and using a perfect hash function, embodiments of the invention are able to efficiently determine the amount of data that will be become available on the local computing device after the selected data is transferred to the remote storage device. As a result, the local computing device manager and/or users of the local computing device can readily and efficiently manage the persistent storage and also determine when it is appropriate to transfer certain files from the persistent storage to the remote storage device.

FIG. 1 shows an example system in accordance with one or more embodiments of the invention. The system includes a local computing device (100) and a remote storage device (150). Each component of the system of FIG. 1 may be operably connected via any combination of wired and/or wireless connections. Each component of the system is discussed below.

In one or more embodiments of the invention, the local computing device (100) includes a local computing device manager (110) and persistent storage (120). In one or more embodiments of the invention, the local computing device manager (110) includes functionality for determining an amount of space in the local computing device (100) to could be freed up after completion of transfer of files from the local computing device (100) to the remote storage device (150) and to subsequently initiate the transfer of such files. Depending on the implementation, the transfer of the files to the remote storage device may only occur if a sufficient amount of space is freed up in the persistent storage. If an insufficient amount of space will not be freed up when the transfer of files is completed, then local computing device manager may (with or without input from a user), determine whether there are additional files to transfer and/or to not take any further action and deny the data transfer request. See e.g., FIGS. 2A-2C for additional detail. In one embodiment of the invention, the local storage device includes functionality to perform the methods shown in FIGS. 2A-2C.

Continuing with the discussion of FIG. 1, the local storage device manager (110) may also include functionality to perform de-duplication on the files that are stored in the persistent storage. In one embodiment of the invention, de-duplicating the files, before storing the files in the persistent storage (120), may increase the amount of files that can be stored in the persistent storage when compared to the amount of files that can be stored in the persistent storage (120) without de-duplicating the files. De-duplicating the files may also decrease the cost associated with storing files in the persistent storage (120) by reducing the total amount of storage required to store the de-duplicated files when compared to the amount of storage required to store the files without being de-duplicated.

As used herein, deduplication refers to methods of storing only portions of files (also referred to as file segments or segments) that are not already stored in the persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

Continuing with the discussion of FIG. 1, in one or more of embodiments of the invention, the local computing device manager (110) is implemented as computer instructions, e.g., computer code, stored on a persistent storage that when executed by a processor of the local computing device (100) cause the local computing device (100) to provide the aforementioned functionality of the local computing device manager (110).

Figure 4:
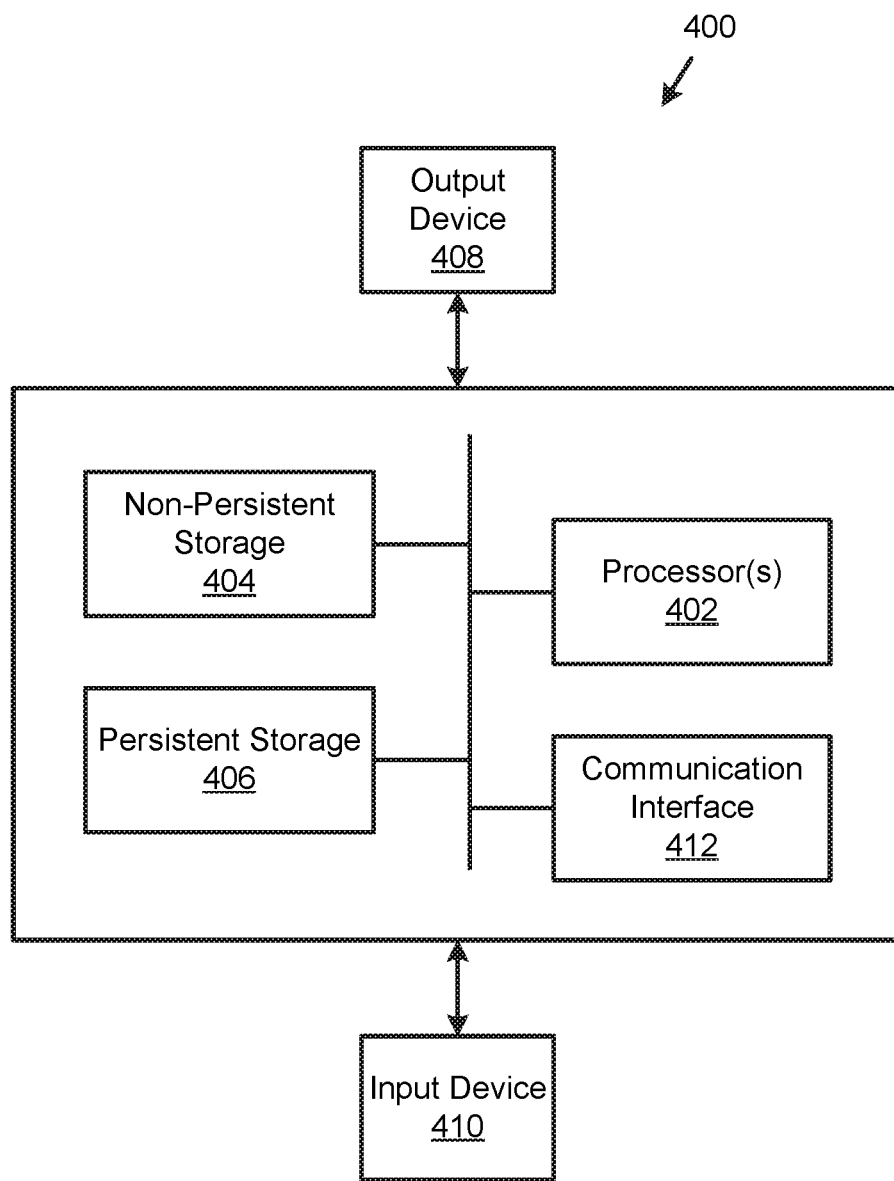
FIG. 4 shows a diagram of a computing device in accordance with one or more embodiments of the invention.

In one or more embodiments of the invention, the local computing device (100) may be a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the local computing device (100) described throughout this application and/or all, or a portion thereof, of the methods illustrated in FIGS. 2A-2C.

In one or more embodiments of the invention, the local computing device (100) is implemented as a logical device. The logical device may utilize the computing resources of any number of computing devices and thereby provide the functionality of the local computing device (100) described throughout this application and/or all, or a portion thereof, of the methods illustrated in FIGS. 2A-2C.

Continuing with the discussion of FIG. 1, in one or more embodiments of the invention, the persistent storage (120) includes any type of non-volatile storage. Examples of non-volatile storage may include, but are not limited to, magnetic storage, optical storage, solid-state storage (e.g., NAND or NOR Flash memory), any other type of non-volatile memory, and/or any combination thereof.

The persistent storage (120) may include (or store) one or more snapshots (122) and one or more containers (126, 128). The persistent storage (120) may include additional, fewer, and/or different data structures (and/or components) without departing from the invention. Each data structure (or component) of the persistent storage (120) is discussed below.

In one embodiment of the invention, each snapshot (122) includes references to the segments stored in the local computing device (100). More specifically, because the files are de-duplicated prior to being stored in the persistent storage, each file is stored as a series of segments, where each segment includes data and/or metadata associated with the file. As such, the snapshot includes references to the segments corresponding to the files that are stored in the persistent storage.

In one embodiment of the invention, the segments may be logically grouped together into containers (126, 128). Each container may include a container index (126A) and container data (126B). The container data (126B) includes certain segments of one or more files and a container index (126A) that specifies which segments are in the corresponding container and the location of each segment within the corresponding container.

In one or more embodiments of the invention, the remote storage device (150) stores data received from one or more local computing devices and/or provides data stored thereon to one or more local computing devices. In one or more embodiments of the invention, the remote storage device (150) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the remote storage device (150) described throughout this application.

In one or more embodiments of the invention, the remote storage device (150) is implemented as a logical device. The logical device may utilize the computing resources of any number of computing devices and thereby provide the functionality of the remote storage device (150) described throughout this application.

Figure 2A:
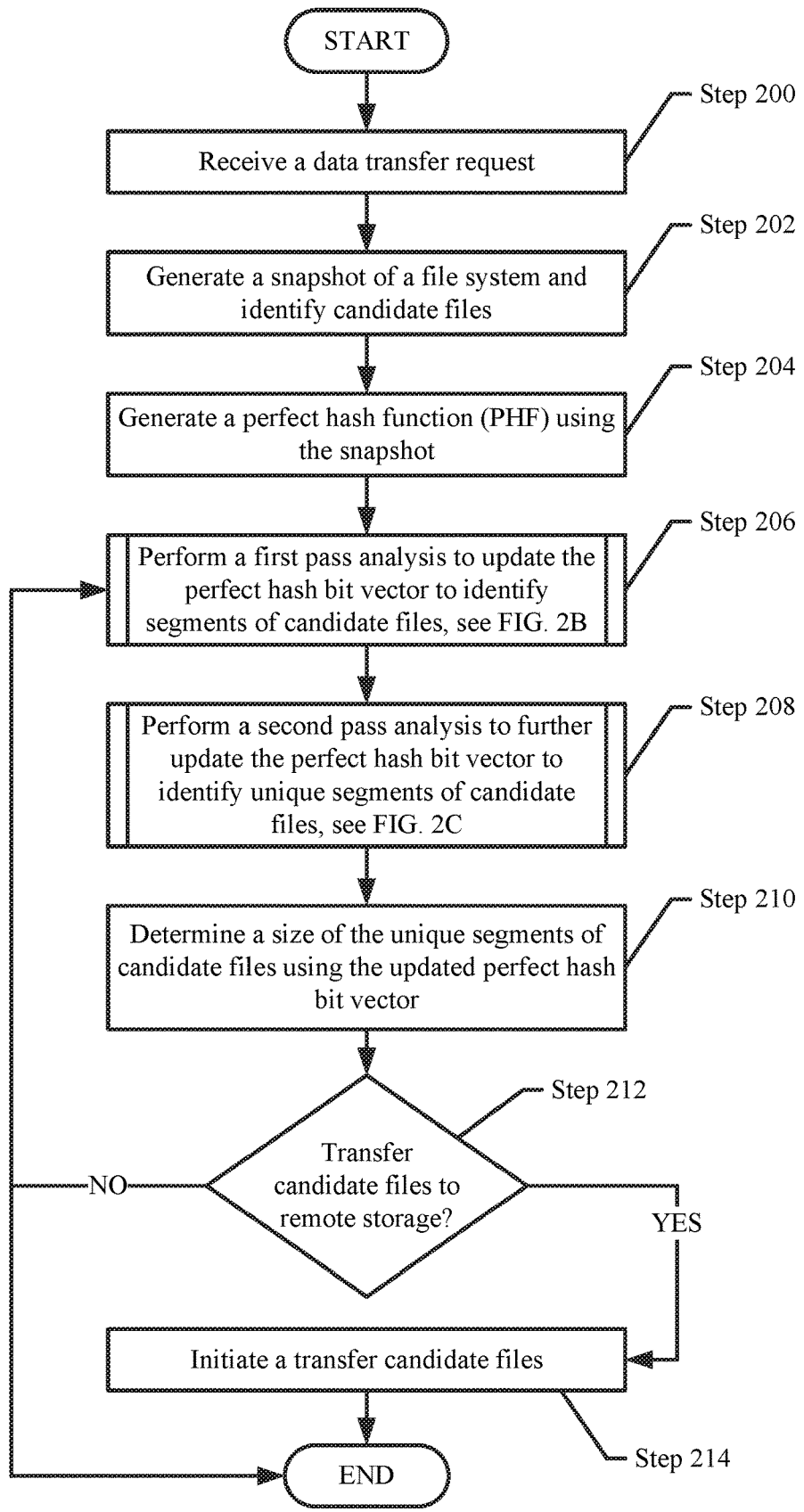
FIG. 2A shows a flowchart for managing persistent storage in accordance with one or more embodiments of the invention.
Figure 2B:
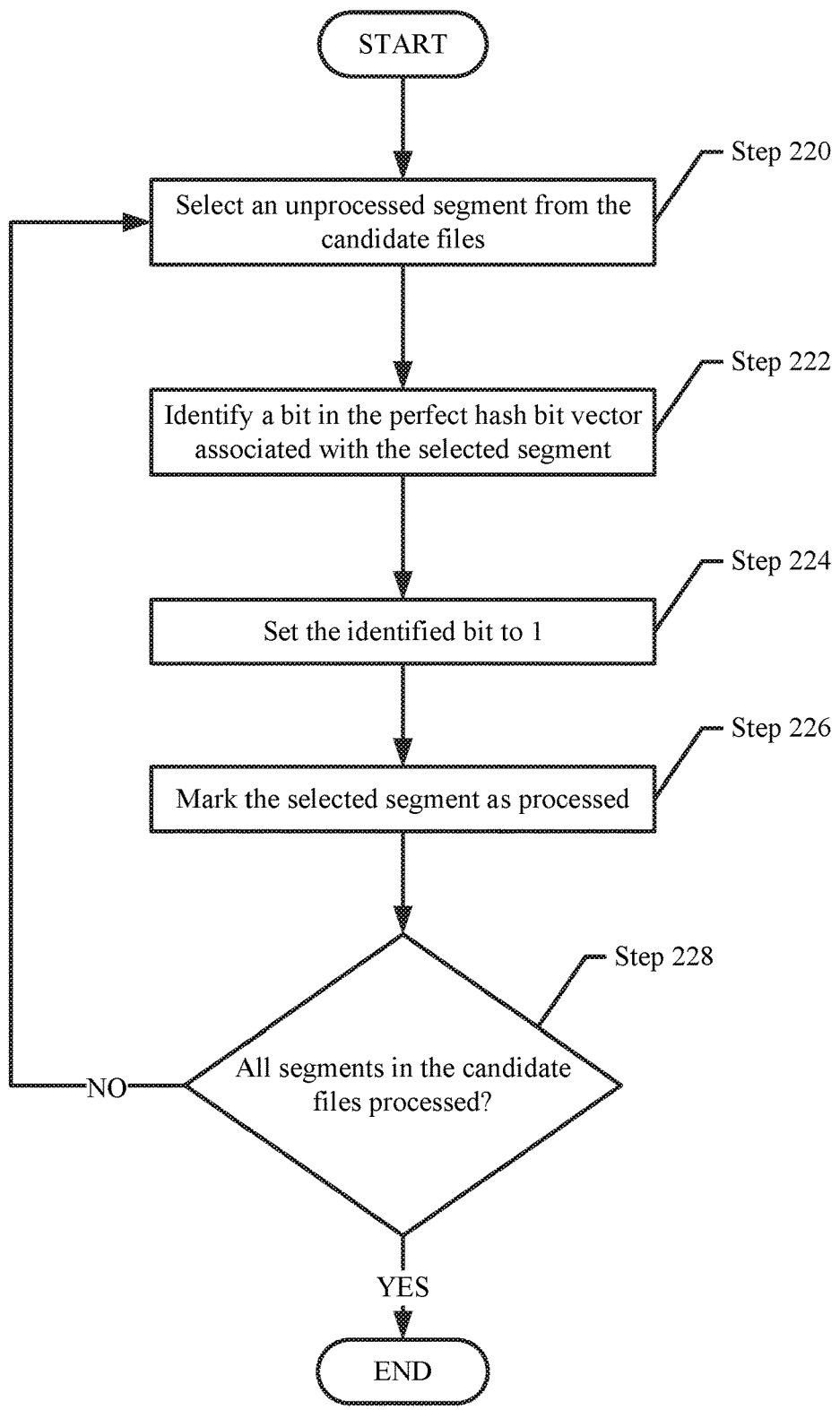
FIG. 2B shows a flowchart for performing a first pass analysis in accordance with one or more embodiments of the invention.
Figure 2C:
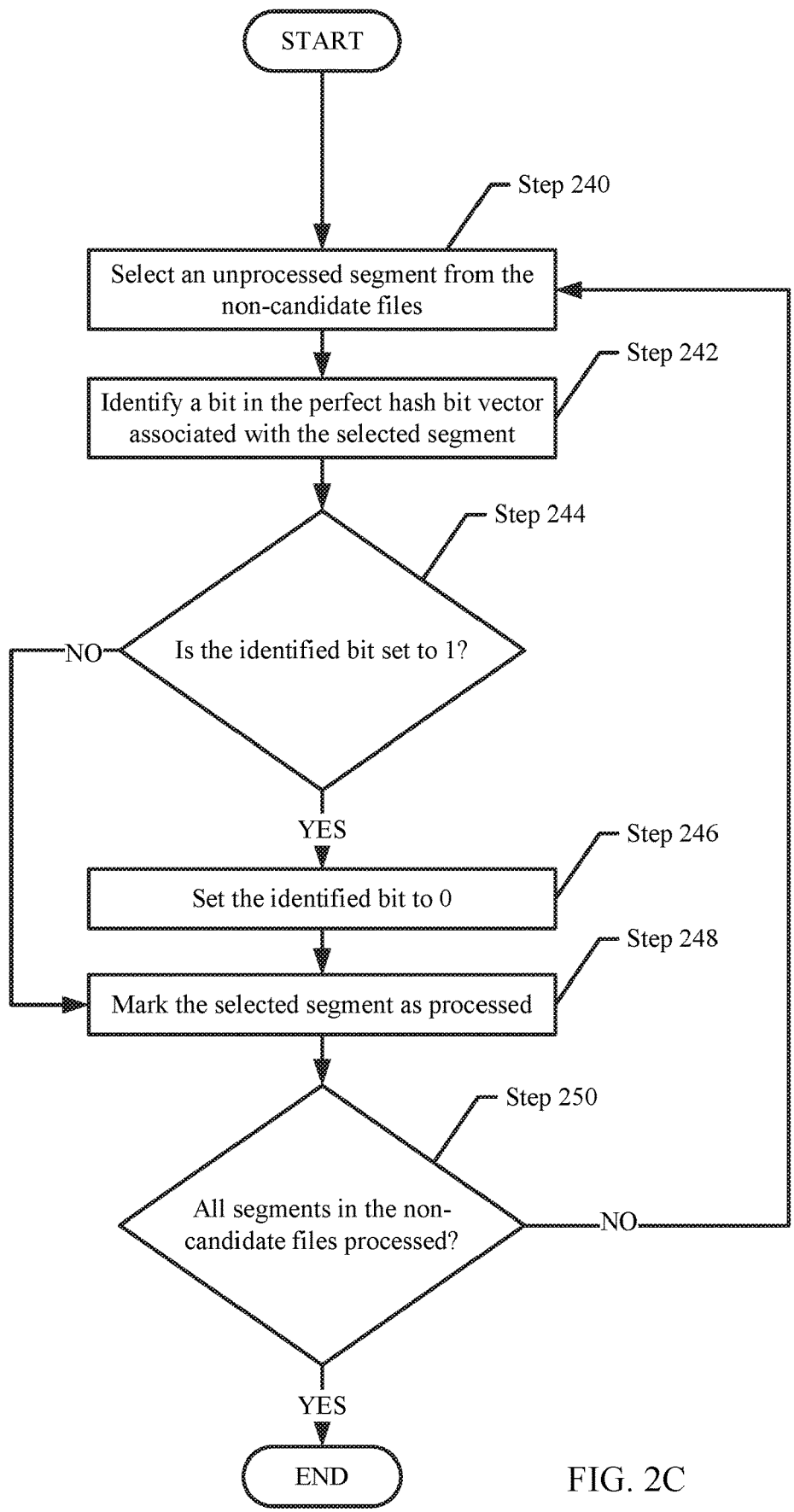
FIG. 2C shows a flowchart for performing a second pass analysis in accordance with one or more embodiments of the invention.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

The method shown in FIGS. 2A-2C may be performed by, for example, a local computing device manager (110, FIG. 1). Other components of the system illustrated in FIG. 1 may perform the methods shown in FIGS. 2A-2C without departing from the invention.

Turning to FIG. 2A, FIG. 2A shows a flowchart for managing persistent storage in accordance with one or more embodiments of the invention.

Turning to FIG. 2A, in Step 200, a data transfer request is received. The data transfer request may be initiated by a user of the local computing device, a user of a computing device operatively connected to the local computing device, by an automated process on the local computing device, and/or by an automated process on a computing device operatively connected to the local computing device. The data transfer request may specify specific criterion (or criteria) that may be used to identify the specific files to transfer from the persistent storage to the remote storage device. For example, the data transfer request may specify that files A-M are to be transferred and/or the data transfer request may specify that files that were created between a given data range are to be transferred.

Continuing with the discussion of FIG. 2A, in Step 202, a snapshot of the files in persistent storage is generated. As discussed above, the snapshot includes references to each of the segments (i.e., segments of files) stored in the persistent storage. In one embodiment of the invention, a reference to the segment (also referred to as a fingerprint) uniquely identifies the segment in the snapshot.

In Step 204, a perfect hash function (PHF) is generated using the snapshot. In one or more embodiments of the invention, the PHF is generated by analyzing the references in the snapshot and generating a hash function (referred to as a PHF), which uniquely maps each reference (or fingerprint) in the snapshot to a unique hash value. The PHF, which is unique to the snapshot, may be generated using any known or later discovered method or technique. Each unique hash value is then mapped to a unique location in a bit vector referred to as a perfect hash bit vector. The number of bits in perfect hash bit vector may correspond to at least the number of unique hash values generated by the fingerprints in the snapshot. Initially, the bits in the perfect hash bit vector are all set to 0 (or 1, depending on the implementation) at the end of Step 204.

In Step 206, a first pass analysis is performed to update the perfect hash bit vector to identify segments of candidate files. In one or more embodiments of the invention, the first pass analysis is performed by processing file segments referenced by the snapshot that are associated with candidate files and updating the perfect hash function to specify the processed file segments.

In one or more embodiments of the invention, a candidate file is a file that is eligible to be transferred to the remote storage device. The file may be eligible if the file meets the specific criterion (or criteria) specified in the data transfer request. For example, if a file satisfies the criterion that it must have been stored for more than 30 days in the local computing device, the file may be deemed a candidate file. Other criterion (or criteria) may be specified without departing from the invention.

In one or more embodiments of the invention, the segments of candidate files are identified by enumerating the snapshot to identify all references for the segments that are associated with each candidate file. The local computing device may use the identified file segments to perform the first pass analysis.

In one or more embodiments of the invention, the first pass analysis is performed via the method illustrated in FIG. 2B. The first pass analysis may be performed via other methods without departing from the invention.

In Step 208, a second pass analysis is performed to further update the perfect hash bit vector to identify segments of candidate files that are unique (i.e., they are not also segments of the non-candidate files). In one or more embodiments of the invention, the second pass analysis is performed by processing segments referenced by the snapshot that are associated with non-candidate files and updating the perfect hash function to specify the processed file segments. A file may be a non-candidate file if the file does not meet predetermined criterion (or criteria).

In one or more embodiments of the invention, the segments of the non-candidate files are identified by enumerating the snapshot to identify all segment references that are associated with the non-candidate files. The local computing device may use the identified segments to perform the second pass analysis. In one or more embodiments of the invention, the second pass analysis is performed via the method illustrated in FIG. 2C. The second pass analysis may be performed via other methods without departing from the invention.

The result of step 210 is a populated perfect hash bit vector (also referred to an updated perfect hash bit vector) that identifies the unique segments of the candidate files (i.e., the segments that may be transferred to the remote storage device).

In Step 210, a size of the unique segments of candidate files is determined using the updated perfect hash bit vector. In one or more embodiments of the invention, the size is determined by identifying a size of each segment specified by the perfect hash bit vector and aggregating the identified sizes of each file segments to obtain the freed space (i.e., the amount of space on the persistent storage that will become available upon completion of the transfer of the candidate files to the persistent storage).

In Step 212, a determination is made about whether to initiate the transfer of the candidate files to persistent storage. If the transfer of the candidate files is to be initiated, the method proceeds to step 214; otherwise, the method proceeds to step 206 or ends.

The determination in step 212 may be based on whether the amount of space that will be freed up in the persistent storage following the transfer of the candidate files is greater than or equal to a threshold amount. The threshold amount may be specified by a user and/or determined by the local computing device manager (or another process executing on the local computing device or another computing device operatively connected to the local computing device). The threshold amount may be a static amount or may be a dynamic amount. In either scenario, the specific value used may be based, for example, on historical usage and/or current usage of the persistent storage. Other factors may be used to determine the threshold amount without departing from the invention.

If the amount of space that will be freed up (also referred to as the "projected freed amount") is less than the threshold amount, then the method may either end (e.g., the data transfer request is denied) or proceed to step 206. If the method proceeds to step 206, then (not shown) an updated set of candidate files is selected. The updated set of candidate files is then processed in accordance with steps 206-212. The process may be repeated until: (i) transferring selected set of candidates will free up an amount of space that is at least equal to the threshold amount; or (ii) the user, the local computing device manager, or another process executing on the local computing device or executing on another computing device operatively connected to the local computing device halts the process.

Continuing with the discussion of FIG. 2A, in Step 214, the local computing device initiates the transfer of the segments associated with the candidate files from the local computing device to the remote storage device. Further, the local computer device (or local computing device manager) may notify various other components in the system the projected freed amount of space that will become available after the candidate files have been transferred as determined in Step 210.

In one embodiment of the invention, once the predicted amount of space that becomes available is determined, the local computing device manager may notify the user (e.g., via email, via a message on a user interface of the local computing device, or via any other electronic and/or visual mechanism). The user may then be prompted about whether they want to authorize the transfer of the candidate files and/or select additional or different candidate files to transfer. In this manner, the user may repeat Step 202-210 (or portions thereof) in order to determine an optimal number of candidates files to transfer in order to, e.g., free up a desired amount of space in the persistent storage on the local computing device.

FIG. 2B shows a flowchart for performing a first pass analysis in accordance with one or more embodiments of the invention. In Step 220, an unprocessed segment is selected from the set of segments associated with the candidate files.

In Step 222, a bit in the perfect hash bit vector associated with the selected segment is identified. In one or more embodiments of the invention, the bit is identified by applying the PHF to the fingerprint associated with the identified segment to generate a hash value. The hash value is then mapped to a unique location (i.e., bit) in the perfect hash bit vector.

In Step 224, the identified bit is set to 1 (or 0 if the bit was initialized to 1).

In Step 226, the selected segment is marked as processed.

In Step 228, a determination is made about whether all segments in the candidate files have been processed. If all segments have processed, the method ends; otherwise, the method proceeds to Step 220.

The result of the method shown in FIG. 2B is a populated perfect hash bit vector, where each bit in the perfect hash bit vector that is set to 1 corresponds to a segment associated with a candidate file. However, because the files (including the candidate files) are stored in the persistent storage using de-duplication, a given segment may be associated with both candidate and non-candidate files. Accordingly, in FIG. 2C, the populated perfect hash bit vector is updated in order to identify only the segments are that unique to the candidate files.

FIG. 2C shows a flowchart for performing a second pass analysis in accordance with one or more embodiments of the invention. In Step 240, an unprocessed segment is selected from the set of segments associated with the non-candidate files.

In Step 242, a bit in the perfect hash bit vector associated with the selected segment is identified. In one or more embodiments of the invention, the bit is identified by applying the PHF to the fingerprint associated with the identified segment to generate a hash value. The hash value is then mapped to a unique location (i.e., bit) in the perfect hash bit vector.

In Step 244, a determination is made about whether the identified bit in step 242 is set to 1. If the identified bit is set to 1, the method proceeds to Step 246; otherwise, the method proceeds to Step 248.

In Step 246, the identified bit set is set to 0.

In Step 248, the selected segment is marked as processed.

In Step 250, a determination is made about whether all segments in the non-candidate files have been processed. If all segments in the non-candidate files have been processed, the method ends; otherwise, the method may proceed to Step 240.

The result of the method shown in FIG. 2C is an updated perfect hash bit vector, where each bit in the perfect hash bit vector that is set to 1 corresponds to a segment that is uniquely associated with candidate files (i.e., the identified segments are not associated with any non-candidate files).

Example

Figure 3A:
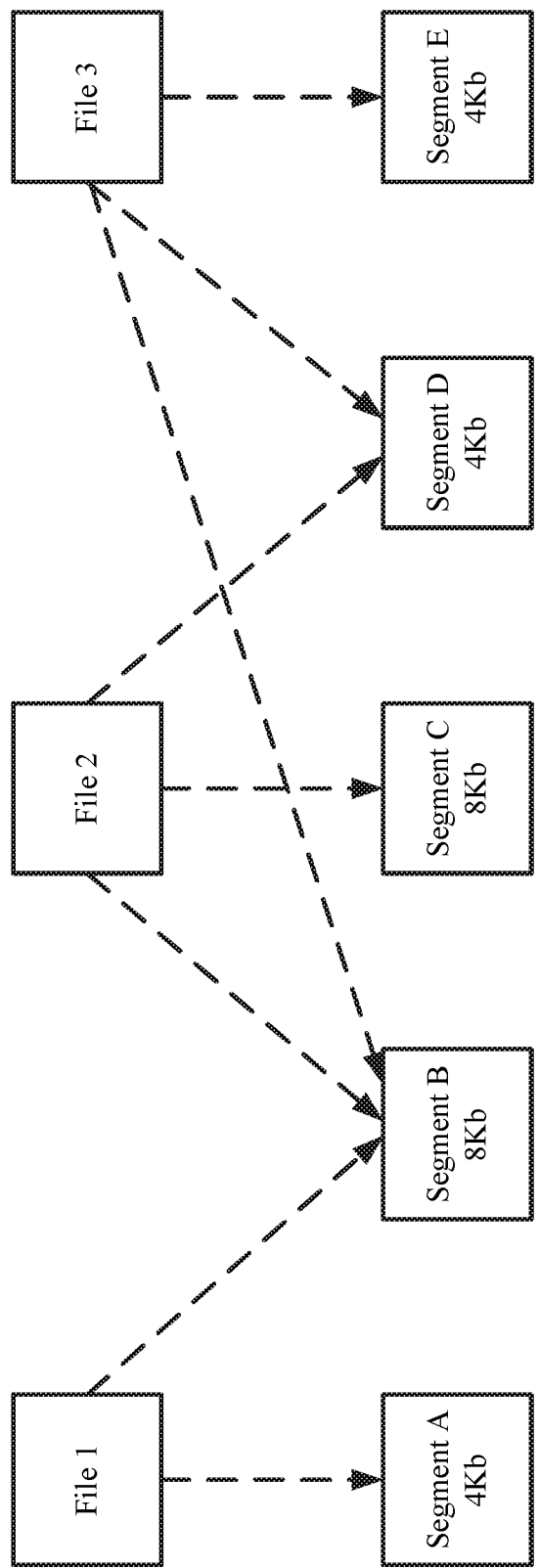
FIGS. 3A-3C show an example in accordance with one or more embodiments of the invention.

The following section describes an example. The example is not intended to limit the invention. The example may be illustrated in FIGS. 3A-3C. Turning to the example, a data transfer request has been initiated on a local computing device, where the data transfer request specifies that File 1 and File 2 are to be transferred to a remote storage device. As shown FIG. 3A, the files are stored after being de-duplicated. File 1 is associated with Segments A-B, File 2 is associated with Segments B, C, and D, and File 3 is associated with Segments B, D, and E.

In response to the data transfer request, the local computing device performs the methods shown in FIGS. 2A-2C. Specifically, the local computing device takes a snapshot of the files in the persistent storage, where the snapshot includes the following: Segment A Reference (SAR), Segment B Reference (SBR), Segment C Reference (SCR), Segment D Reference (SDR), and Segment E Reference (SER).

Figure 3B:
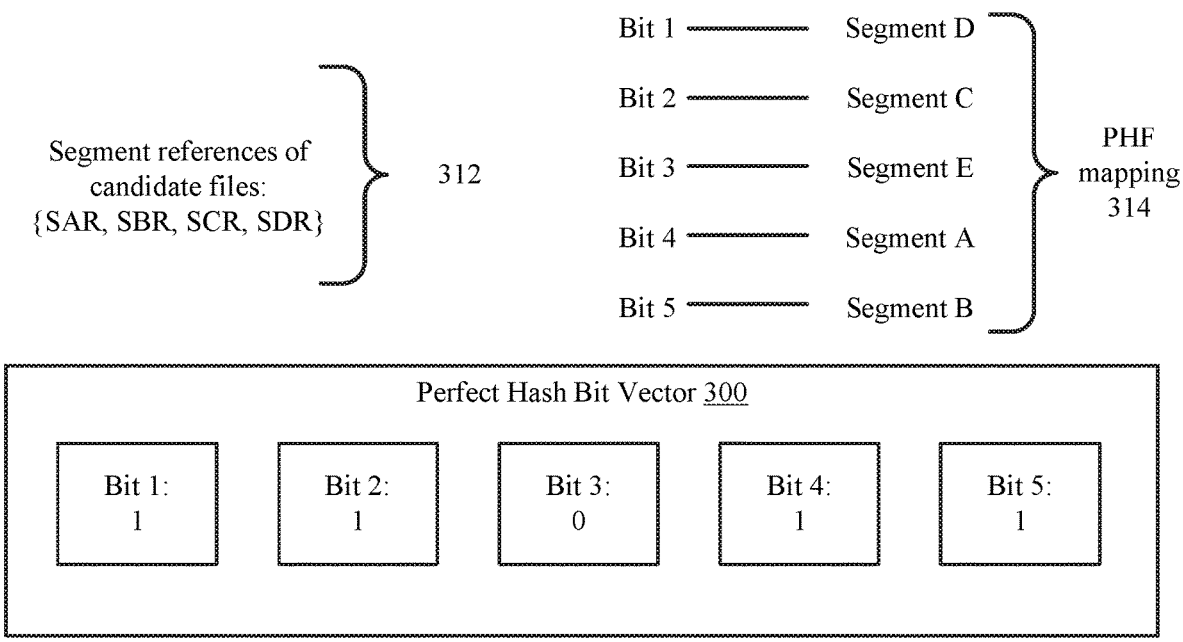
Figure 3C:
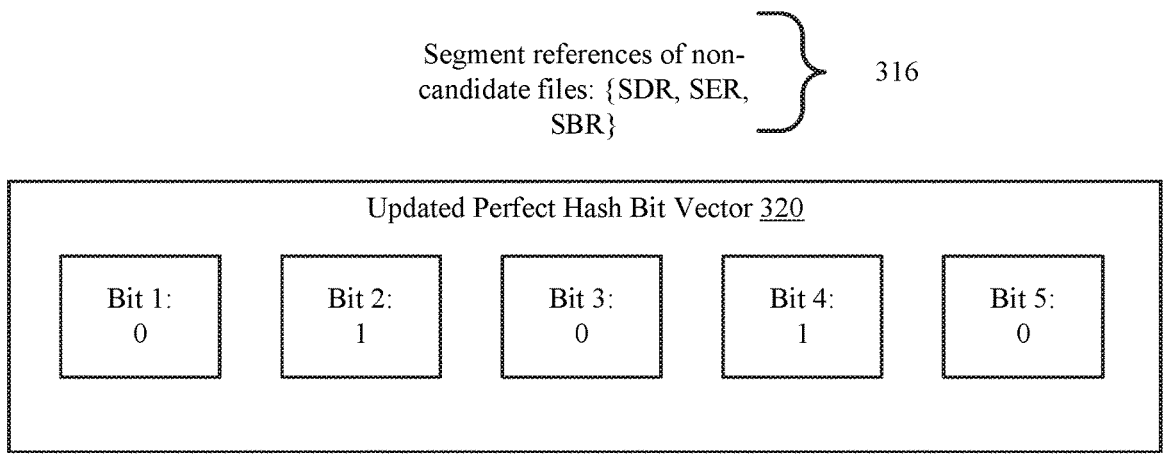

Referring to FIG. 3B, the local computing device uses the segment references in the snapshot (i.e., SAR, SBR, SCR, SDR, SER) to generate a perfect hash function (PHF). The local computing device applies the PHF to each segment reference to generate a hash value. Each hash value is mapped to a bit in a perfect hash bit vector (300) as specified in the PHF mapping (314). The perfect hash bit vector (300) is mapped so that each bit is associated with a unique segment reference.

The local computing device then enumerates the snapshot to identify a number of segment references that are associated with candidate files (312). The candidate files are files that satisfy the criterion specified in the data transfer request. In this scenario, Files 1 and 2 are candidate files. The local computing device then determines, from the snapshot, that SAR, SBR, SCR, and SDR are the segment references of candidate files (312) because they reference segments associated with files 1 and 2 (i.e., the candidate files).

The segment references of candidate files (312) are used by the local computing device to perform a first pass analysis. In accordance with FIG. 2B, the local computing device processes each segment reference of candidate files to generate a populated perfect hash bit vector (300). Specifically, as a result of the first pass analysis, the values in bit 4 (associated with SAR), bit 5 (associated with SBR), bit 2 (associated with SCR), and bit 1 (associated with SDR) are all set to 1. In this manner, bits in the perfect hash bit vector that are set to 1 correspond to segments in persistent storage of the local computing device associated with candidate files.

The local computing device may perform a second pass analysis to further update the perfect hash bit vector (300) in accordance with FIG. 2C. Specifically, the local computing device identifies, from the snapshot, segment references of non-candidate files (316). These are segments that are associated with files that do not meet criterion (or criteria) specified data transfer request. The segments of non-candidate files are segments B, D, and E.

The segment references of non-candidate files (316) (i.e., SBR, SDR, SER) are then used by the local computing device to perform a second pass analysis. The local computing device may process each segment reference of non-candidate files to set a bit associated with the perfect hash bit vector to 0. As a result of the second pass analysis, bit 5 (associated with SBR) and bit 1 (associated with SDR) are changed to 0. Bit 3 (associated with SER) remains set as 0 as it was prior to the second pass analysis.

The result of the second pass analysis is an updated perfect hash bit vector (320), where each bit in the updated perfect hash bit vector (320) that is set to 1 corresponds to a segment that is uniquely associated with candidate files (i.e., the identified segments are not associated with any non-candidate files).

The local computing device then determines projected freed amount of space if the candidate files are transferred. In this example, using the updated perfect hash bit vector, the local computing device determines that the amount of space in the persistent storage that will become available after the transfer of the candidate files is 14 Kb (i.e., the sum of Segment A and Segment C). For purposes of this example assume that the local computing device manager determines that 14 Kb is greater than the threshold amount. Accordingly, the transfer of the candidate files to the remote storage device is initiated.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of storing data on a computing device. The efficiency may be improved by modifying a method for determining a size of space to be freed from a computing device after completion of a transfer of files to a remote storage device.

Because of the nature of de-duplicated segments, some segments may be associated with both candidate files and non-candidate files. Therefore, the process of identifying segments that are uniquely associated with candidate files may be computationally expensive. Embodiments of the invention may minimize the amount of processing used by the computing device when determining which de-duplicated segments are uniquely associated with candidate files. Further, embodiments of the invention allow the local computing device to determine whether transferring the files to the remote storage device should be performed and to take the appropriate actions.

Thus, embodiments of the invention may address the problem of inefficient use of computing resources. This problem arises due to the technological nature of the environment in which files are de-duplicated prior to storage in persistent storage.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing persistent storage, the method comprising:
   generating a perfect hash function (PHF) using a snapshot for a plurality of files stored in the persistent storage;
   populating a bit vector using the PHF and a plurality of segment references to obtain a populated bit vector, wherein each of the plurality of segment references is associated with at least one candidate file of a plurality of candidate files and wherein the plurality of candidate files is a subset of the plurality of files;
   updating the bit vector using the PHF and a second plurality of segment references to obtained an updated bit vector, wherein each of the second plurality of segment references is associated with at least one non-candidate file of a plurality of non-candidate files and wherein the plurality of non-candidate files is a second subset of the plurality of files;
   making a determination that a projected freed amount of space in the persistent storage is below a threshold amount, wherein the projected freed amount of space is determined using the updated bit vector; and
   performing an action based on the determination.

2. The method of claim 1, further comprising:
   prior to generating the PHF:
      receiving a data transfer request; and
      identifying, using the data transfer request, the plurality of candidate files.

3. The method of claim 2, wherein the action comprises denying the data transfer request.

4. The method of claim 1,
   wherein the action comprises issuing a notification to a user;
   wherein the method further comprises:
      receiving authorization from the user to initiate transferring of the plurality of candidate files to a remote storage device;
      initiating, in response to the authorization, the plurality of candidate files to the remote storage device.

5. The method of claim 1, wherein the action comprises selecting a second set of candidate files from the plurality of files.

6. The method of claim 1, wherein the snapshot comprises the plurality of segment references and the second plurality of segment references.

7. The method of claim 1, wherein the threshold amount is determined based on historical usage of the persistent storage.

8. A system, comprising:
   persistent storage comprising a plurality of files;
   a processor;
   local computing device manager when executed by the processor performs the method, the method comprising:
      generating a perfect hash function (PHF) using a snapshot for the plurality of files;
      populating a bit vector using the PHF and a plurality of segment references to obtain a populated bit vector, wherein each of the plurality of segment references is associated with at least one candidate file of a plurality of candidate files and wherein the plurality of candidate files is a subset of the plurality of files;
      updating the bit vector using the PHF and a second plurality of segment references to obtained an updated bit vector, wherein each of the second plurality of segment references is associated with at least one non-candidate file of a plurality of non-candidate files and wherein the plurality of non-candidate files is a second subset of the plurality of files;
      making a determining that a projected freed amount of space in the persistent storage is below a threshold amount, wherein the projected freed amount of space is determined using the updated bit vector; and
      performing an action based on the determination.

9. The system of claim 8, wherein the method further comprises:
   prior to generating the PHF:
      receiving a data transfer request; and
      identifying, using the data transfer request, the plurality of candidate files.

10. The system of claim 9, wherein the action comprises denying the data transfer request.

11. The system of claim 8,
   wherein the action comprises issuing a notification to a user;
   wherein the method further comprises:
      receiving authorization from the user to initiate transferring of the plurality of candidate files to a remote storage device;

initiating, in response to the authorization, the plurality of candidate files to the remote storage device.

12. The system of claim 8, wherein the action comprises selecting a second set of candidate files from the plurality of files.

13. The system of claim 8, wherein the snapshot comprises the plurality of segment references and the second plurality of segment references.

14. A non-transitory computer readable medium comprising computer readable program code, which when executed by a computer processor enables the computer processor to perform a method for managing persistent storage, the method comprising:
   generating a perfect hash function (PHF) using a snapshot for a plurality of files stored in the persistent storage;
   populating a bit vector using the PHF and a plurality of segment references to obtain a populated bit vector, wherein each of the plurality of segment references is associated with at least one candidate file of a plurality of candidate files and wherein the plurality of candidate files is a subset of the plurality of files;
   updating the bit vector using the PHF and a second plurality of segment references to obtained an updated bit vector, wherein each of the second plurality of segment references is associated with at least one non-candidate file of a plurality of non-candidate files and wherein the plurality of non-candidate files is a second subset of the plurality of files;
   making a determination that a projected freed amount of space in the persistent storage is below a threshold amount, wherein the projected freed amount of space is determined using the updated bit vector; and
   performing an action based on the determination.

15. The non-transitory computer readable medium of claim 14, the method further comprising:
   prior to generating the PHF:
      receiving a data transfer request; and
      identifying, using the data transfer request, the plurality of candidate files.

16. The non-transitory computer readable medium of claim 15, wherein the action comprises denying the data transfer request.

17. The non-transitory computer readable medium of claim 14,
   wherein the action comprises issuing a notification to a user;
   wherein the method further comprises:
      receiving authorization from the user to initiate transferring of the plurality of candidate files to a remote storage device;
      initiating, in response to the authorization, the plurality of candidate files to the remote storage device.

18. The non-transitory computer readable medium of claim 14, wherein the action comprises selecting a second set of candidate files from the plurality of files.

19. The non-transitory computer readable medium of claim 14, wherein the snapshot comprises the plurality of segment references and the second plurality of segment references.

20. The non-transitory computer readable medium of claim 14, wherein the threshold amount is determined based on historical usage of the persistent storage.

* * * * *

UNITED STATES PATENT AND TRADEMARK OFFICE
CERTIFICATE OF CORRECTION

PATENT NO. : 10,713,217 B2
APPLICATION NO. : 16/174474
DATED : July 14, 2020
INVENTOR(S) : Srinivasan et al.

Page 1 of 1

It is certified that error appears in the above-identified patent and that said Letters Patent is hereby corrected as shown below:

In the Claims

Column 11, Line 57 in Claim 1, the phrase "to obtained an updated" should read -- to obtain an updated --.
Column 12, Line 41 in Claim 8, the phrase "to obtained an updated" should read -- to obtain an updated --.
Column 12, Line 48 in Claim 8, the phrase "making at determining" should read -- making a determination --.
Column 13, Line 24 in Claim 14, the phrase "to obtained an updated" should read -- to obtain an updated --.

Signed and Sealed this
Twenty-seventh Day of August, 2024

Katherine Kelly Vidal
*Director of the United States Patent and Trademark Office*